(12) United States Patent
Matas et al.

(10) Patent No.: US 12,634,574 B2
(45) Date of Patent: *May 19, 2026

(54) SYSTEMS AND METHODS FOR PREVIEWING NEWLY CAPTURED IMAGE CONTENT AND REVIEWING PREVIOUSLY STORED IMAGE CONTENT

(71) Applicant: Apple Inc., Cupertino, CA (US)

(72) Inventors: Michael Matas, San Francisco, CA (US); Mallory Paine, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/649,900

(22) Filed: Apr. 29, 2024

(65) Prior Publication Data

US 2024/0334041 A1      Oct. 3, 2024

Related U.S. Application Data

(63) Continuation of application No. 18/125,080, filed on Mar. 22, 2023, now Pat. No. 11,974,037, which is a
(Continued)

(51) Int. Cl.
*H04N 23/63* (2023.01)
*G06F 3/04817* (2022.01)
(Continued)

(52) U.S. Cl.
CPC ....... *H04N 23/632* (2023.01); *G06F 3/04817* (2013.01); *G06F 3/04842* (2013.01); *G06F 3/04883* (2013.01); *H04N 1/0044* (2013.01);

*H04N 5/772* (2013.01); *H04N 9/8715* (2013.01); *H04N 21/41407* (2013.01); *H04N 21/4223* (2013.01); *H04N 21/4316* (2013.01);
(Continued)

(58) Field of Classification Search
CPC .... H04N 23/632; H04N 1/0044; H04N 5/772; H04N 9/8715; H04N 21/41407; H04N 21/4223; H04N 21/4316; H04N 21/4334; H04N 21/440263; H04N 21/482; H04N 23/62; H04N 23/63; G06F 3/04817; G06F 3/04842; G06F 3/04883; G06F 2203/04803; G06F 2203/04808
See application file for complete search history.

(56) References Cited

U.S. PATENT DOCUMENTS 6,122,003 A * 9/2000 Anderson .......... H04N 1/00397
                                              348/207.99
6,515,704 B1    2/2003 Sato
(Continued)

OTHER PUBLICATIONS

HTC Smart Mobility, "HTC Touch HD User's Manual", www.htc. com, 2013, 300 pages.
(Continued)

*Primary Examiner* — Ahmed A Berhan
(74) *Attorney, Agent, or Firm* — Morgan, Lewis & Bockius LLP

(57) ABSTRACT

Systems and methods for previewing newly captured image content and reviewing previously stored image content using an electronic device are provided. The previously stored image content may include an individual distinct image or at least two consecutive video frame images.

27 Claims, 4 Drawing Sheets

Related U.S. Application Data continuation of application No. 17/403,735, filed on Aug. 16, 2021, now Pat. No. 11,622,079, which is a continuation of application No. 16/706,504, filed on Dec. 6, 2019, now Pat. No. 11,095,822, which is a continuation of application No. 15/994,777, filed on May 31, 2018, now Pat. No. 10,506,169, which is a continuation of application No. 15/249,220, filed on Aug. 26, 2016, now Pat. No. 9,992,420, which is a continuation of application No. 14/868,277, filed on Sep. 28, 2015, now Pat. No. 9,591,227, which is a continuation of application No. 12/475,256, filed on May 29, 2009, now Pat. No. 9,148,618.

(51) Int. Cl.

| | |
|---|---|
| *G06F 3/04842* | (2022.01) |
| *G06F 3/04883* | (2022.01) |
| *H04N 1/00* | (2006.01) |
| *H04N 5/77* | (2006.01) |
| *H04N 9/87* | (2006.01) |
| *H04N 21/414* | (2011.01) |
| *H04N 21/4223* | (2011.01) |
| *H04N 21/431* | (2011.01) |
| *H04N 21/433* | (2011.01) |
| *H04N 21/4402* | (2011.01) |
| *H04N 21/482* | (2011.01) |
| *H04N 23/62* | (2023.01) |

(52) U.S. Cl.
CPC . *H04N 21/4334* (2013.01); *H04N 21/440263* (2013.01); *H04N 21/482* (2013.01); *H04N 23/62* (2023.01); *H04N 23/63* (2023.01); *G06F 2203/04803* (2013.01); *G06F 2203/04808* (2013.01)

(56) References Cited

U.S. PATENT DOCUMENTS

| | | | |
|---|---|---|---|
| 7,053,951 B2 | 5/2006 | Miller et al. | |
| 7,479,949 B2 | 1/2009 | Jobs et al. | |
| 7,480,002 B2 | 1/2009 | Goh et al. | |
| 7,667,759 B2 | 2/2010 | Suzuki et al. | |
| 7,714,926 B2 | 5/2010 | Kobayashi et al. | |
| 7,732,768 B1 | 6/2010 | Haigh et al. | |
| 8,106,856 B2 | 1/2012 | Matas et al. | |
| 8,189,087 B2 * | 5/2012 | Misawa | H04N 23/633 |
| | | | 348/333.05 |
| 9,148,618 B2 | 9/2015 | Matas et al. | |
| 9,591,227 B2 | 3/2017 | Matas et al. | |
| 9,992,420 B2 | 6/2018 | Matas et al. | |

| | | | |
|---|---|---|---|
| 10,506,169 B2 * | 12/2019 | Matas | H04N 23/63 |
| 11,095,822 B2 | 8/2021 | Matas et al. | |
| 2005/0118990 A1 | 6/2005 | Stephens | |
| 2007/0109429 A1 | 5/2007 | Suzuki et al. | |
| 2007/0188646 A1 * | 8/2007 | Kobayashi | G06F 3/0488 |
| | | | 348/E5.047 |
| 2008/0180408 A1 * | 7/2008 | Forstall | H04M 1/2746 |
| | | | 345/177 |
| 2008/0239132 A1 | 10/2008 | Kohama | |
| 2009/0015703 A1 | 1/2009 | Kim et al. | |
| 2009/0295976 A1 * | 12/2009 | Choi | H04N 23/635 |
| | | | 348/E5.022 |
| 2010/0302409 A1 | 12/2010 | Matas et al. | |
| 2011/0163971 A1 | 7/2011 | Wagner et al. | |
| 2013/0063644 A1 | 3/2013 | Jones et al. | |
| 2016/0028962 A1 | 1/2016 | Matas et al. | |
| 2017/0085801 A1 | 3/2017 | Matas et al. | |
| 2019/0045129 A1 | 2/2019 | Matas et al. | |
| 2020/0186718 A1 | 6/2020 | Matas et al. | |
| 2022/0038640 A1 | 2/2022 | Matas et al. | |
| 2023/0232093 A1 | 7/2023 | Matas et al. | |

OTHER PUBLICATIONS

Notice of Allowance, dated Aug. 14, 2015, received in U.S. Appl. No. 12/475,256, 5 pages.
Office Action, dated Jan. 29, 2016, received in U.S. Appl. No. 14/868,277, 9 pages.
Notice of Allowance, dated May 6, 2016, received in U.S. Appl. No. 12/868,277, 6 pages.
Office Action, dated Sep. 8, 2016, received in U.S. Appl. No. 14/868,277, 7 pages.
Notice of Allowance, dated Nov. 14, 2016, received in U.S. Appl. No. 14/868,277, 5 pages.
Office Action, dated Sep. 8, 2017, received in U.S. Appl. No. 15/249,220, 11 pages.
Notice of Allowance, dated Feb. 28, 2018, received in U.S. Appl. No. 15/249,220, 5 pages.
Office Action, dated May 1, 2019, received in U.S. Appl. No. 15/994,777, 33 pages.
Notice of Allowance, dated Aug. 14, 2019, received in U.S. Appl. No. 15/994,777, 8 pages.
Office Action, dated Jan. 22, 2021, received in U.S. Appl. No. 16/706,504, 24 pages.
Notice of Allowance, dated Apr. 14, 2021, received in U.S. Appl. No. 16/706,504, 8 pages.
Office Action, dated May 25, 2022, received in U.S. Appl. No. 17/403,735, 15 pages.
Notice of Allowance, dated Dec. 6, 2022, received in U.S. Appl. No. 17/403,735, 8 pages.
Office Action, dated Aug. 30, 2023, received in U.S. Appl. No. 18/125,080, 18 pages.
Notice of Allowance, dated Dec. 28, 2023, received in U.S. Appl. No. 18/125,080, 8 pages.

* cited by examiner

200

CAPTURE IMAGE CONTENT —402

STORE A FIRST CAPTURED IMAGE CONTENT —404

GENERATE A FIRST REPRESENTATION OF THE FIRST CAPTURED IMAGE CONTENT —406

SIMULTANEOUSLY DISPLAY THE FIRST REPRESENTATION OF THE FIRST CAPTURED IMAGE CONTENT AND THE MOST RECENTLY CAPTURED IMAGE CONTENT —408

400

SYSTEMS AND METHODS FOR PREVIEWING NEWLY CAPTURED IMAGE CONTENT AND REVIEWING PREVIOUSLY STORED IMAGE CONTENT

RELATED APPLICATIONS

This application is a continuation of U.S. application Ser. No. 18/125,080, filed Mar. 22, 2023, which is a continuation of U.S. application Ser. No. 17/403,735, filed Aug. 16, 2021, now U.S. Pat. No. 11,622,079, which is a continuation of U.S. application Ser. No. 16/706,504, filed Dec. 6, 2019, now U.S. Pat. No. 11,095,855, which is a continuation of U.S. application Ser. No. 15/994,777, filed May 31, 2018, now U.S. Pat. No. 10,506,169, which is a continuation of U.S. application Ser. No. 15/249,220, filed Aug. 26, 2016, now U.S. Pat. No. 9,992,420, which is a continuation of U.S. application Ser. No. 14/868,277, filed Sep. 28, 2015, now U.S. Pat. No. 9,591,227, which is a continuation of U.S. application Ser. No. 12/475,256, filed May 29, 2009, now U.S. Pat. No. 9,148,618, which are incorporated herein by reference in their entirety.

FIELD OF THE INVENTION

This can relate to systems and methods for capturing and storing images and, more particularly, to systems and methods for previewing newly captured image content and reviewing previously stored image content using an electronic device.

BACKGROUND OF THE DISCLOSURE

Many electronic devices include the ability to capture images. In particular, many cellular telephones, personal digital assistants, and other portable electronic devices include the functionality of still-image and/or video cameras. Using a camera lens, such an electronic device captures light and stores one or more images as desired by the user. Often, the electronic device displays a "live" preview of the images being captured by the lens in order to help the user appropriately orientate the lens with respect to the desired target. Once a user selects a captured image to be stored, the electronic device traditionally stores the image and displays the stored image in order to permit the user to view what he or she has successfully recorded. However, due to processing limitations, display limitations, and other limitations of such electronic devices, a user must toggle between a preview mode of the electronic device that displays the live preview of the images currently being captured and a review mode of the electronic device that displays one or more previously captured and stored images.

SUMMARY OF THE DISCLOSURE

Systems and methods for previewing newly captured image content and reviewing previously stored image content using an electronic device are provided.

For example, in some embodiments, there is provided an electronic device that may include a display screen, a camera, and processing circuitry. The camera may be configured to capture image content, and the processing circuitry may be configured to store first image content captured by the camera, generate a first representation of the first image content, and simultaneously display the first representation and a live preview of the image content being captured by the camera on the display screen. In some embodiments, the first image content may include a first plurality of consecutive video frame images. In other embodiments, the first image content may include a first individual distinct image.

In some embodiments, the first representation may be a condensed version of the first image content, such as a thumbnail. In some embodiments, the processing circuitry may also be configured to store second image content captured by the camera, and generate a second representation of the second image content. In some embodiments, the processing circuitry may be further configured to replace the first representation with the second representation on the display screen. While, in other embodiments, the processing circuitry may be further configured to simultaneously display the first representation on a first portion of the display screen, the image content most recently captured by the camera on a second portion of the display screen, and the second representation on a third portion of the display screen.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Figure 1:
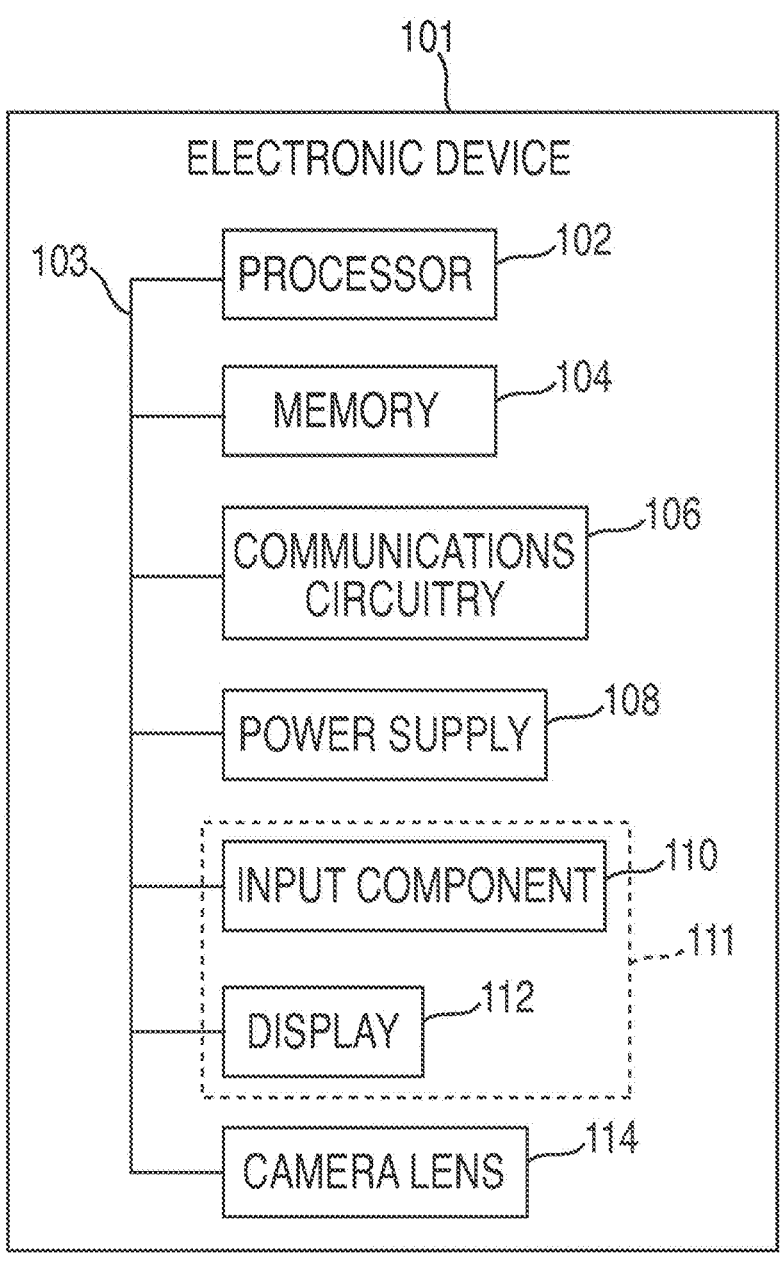
FIG. 1 is a schematic view of an illustrative electronic device in accordance with some embodiments of the invention.

Systems and methods for previewing newly captured image content and reviewing previously stored image content using an electronic device are provided and described with reference to FIGS. 1-4.

An electronic device may be operative to capture images of a user's surroundings. For example, an electronic device may include an optical or digital lens operative to capture light reflected by the user's environment. The electronic device may be operative to store particular images captured by the lens for playback (e.g., to print or to send electronically for others to view). The electronic device may store images at any suitable time, including, for example, in response to receiving a user instruction (e.g., in response to a user providing an input using an input interface of the device), after a delay (e.g., when a timer has been activated), or automatically (e.g., at a particular moment in time or when the electronic device detects a particular movement).

Before the electronic device stores captured image content, such as an individual distinct image or consecutive video frame images, the electronic device may provide the user with a preview of the most recently captured image. In particular, the electronic device may be configured to provide a representation of the image captured by the lens at each moment in time on a display screen of the electronic device (i.e., a "live" view or stream of what is currently being captured). To enable the user to easily aim the lens, preview a captured image, and provide an instruction to store the image without requiring extensive movement of the device, the display screen may be positioned on a side of the device opposite the side of the device exposing the lens. For example, the electronic device may include one or both of a display screen and a viewfinder on a side of the device opposite the side of the lens. In other embodiments, the display screen and the lens may be on the same side or adjacent sides of the electronic device.

The electronic device may store image content at any suitable time. In some embodiments, the electronic device may store image content only in response to receiving a corresponding user input instruction. For example, the electronic device may include a touch-screen, and the electronic device can be configured to allow any contact of one or more certain regions of the touch-screen to constitute an instruction to store captured image content. In other embodiments, the electronic device may store image content in response to various other suitable events, such as, for example, when a period of time elapses, or when a captured image content is determined to include a certain color or object.

Once the electronic device has stored captured image content, the electronic device may provide the user with a review of the stored image content. For example, the electronic device may be configured to provide a representation of the image content most recently stored by the device on the display screen of the electronic device. To enable the user to easily review the stored image content while also being able to preview the most recently captured image, the electronic device may be configured to display both images simultaneously on the display screen. The device may be configured to display previously stored content in various ways with respect to the most recently captured content.

FIG. 1 is a schematic view of an illustrative electronic device 100 for providing preview and review of images to a user. In some embodiments, electronic device 100 may perform a single function (e.g., a device dedicated to storing image content) and, in other embodiments, electronic devices 100 may perform multiple functions (e.g., a device that stores image content, plays music, and receives and transmits telephone calls). Moreover, in some embodiments, electronic device 100 may be any portable, mobile, or hand-held electronic device configured to provide preview and review of images to a user simultaneously wherever the user travels. Alternatively, electronic device 100 may not be portable at all, but may instead be generally stationary. Electronic device 100 may include any suitable type of electronic device operative to capture images and display them to a user. For example, electronic device 100 may include a media player (e.g., an iPod™ available by Apple Inc. of Cupertino, California), a cellular telephone (e.g., an iPhone™ available by Apple Inc.), a personal e-mail or messaging device (e.g., a Blackberry' available by Research In Motion Limited of Waterloo, Ontario), any other wireless communication device, a pocket-sized personal computer, a personal digital assistant ("PDA"), a laptop computer, a desktop computer, a music recorder, a still camera, a movie or video camera or recorder, a radio, medical equipment, any other suitable type of electronic device, and any combinations thereof.

Electronic device 100 may include a processor or control circuitry 102, memory 104, communications circuitry 106, power supply 108, input component 110, image display 112, and camera lens 114. Electronic device 100 may also include a bus 103 that may provide a data transfer path for transferring data, to, from, or between various other components of device 100. In some embodiments, one or more components of electronic device 100 may be combined or omitted. Moreover, electronic device 100 may include other components not combined or included in FIG. 1. For example, electronic device 100 may include motion detection circuitry, light sensing circuitry, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music, image, and video files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHZ, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, and combinations thereof. For example, input component 110 may include a multi-touch screen. Each input component 110 can be configured to provide one or more dedicated control functions for making selections or issuing commands associated with operating device 100.

Electronic device 100 may also include one or more output components that may present information (e.g., textual, graphical, audible, and/or tactile information) to a user of device 100. An output component of electronic device 100 may take various forms, including, but not limited, to audio speakers, headphones, audio line-outs, visual displays, antennas, infrared ports, rumblers, vibrators, or combinations thereof.

For example, electronic device 100 may include image display 112 as an output component. Display 112 may include any suitable type of display or interface for previewing and reviewing images captured by camera lens 114. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder through which a user can see the images captured by camera lens 114. In some embodiments, display 112 may include a viewfinder of the type found in compact digital cameras, reflex cameras, or any other suitable still or video camera.

It should be noted that one or more input components and one or more output components may sometimes be referred to collectively herein as an I/O interface (e.g., input component 110 and display 112 as I/O interface 111). It should also be noted that input component 110 and display 112 may sometimes be a single I/O component, such as a touch screen that may receive input information through a user's touch of a display screen and that may also provide visual information to a user via that same display screen.

Camera lens 114 may include any suitable lens or number of lenses operative to capture images of the surrounding environment of electronic device 100. For example, camera lens 114 may include any number of optical or digital lenses for capturing light reflected by the user's environment as an image. The captured light may be stored as an individual distinct image or as consecutive video frame images of a recording (e.g., several video frames including a primary frame and one or more subsequent frames that may indicate the difference between the primary frame and the subsequent frame). As used herein, the term "camera lens" may be understood to mean a lens for capturing light or a lens and appropriate circuitry for capturing and converting captured light into an image that can be previewed or stored by electronic device 100 as either an individual distinct image or as one of many consecutive video frame images.

Processor 102 of device 100 may control the operation of many functions and other circuitry provided by device 100. For example, processor 102 may receive input signals from input component 110 and/or drive output signals through display 112. Processor 102 may load a user interface program (e.g., a program stored in memory 104 or another device or server) to determine how instructions or data received via an input component 110 or camera lens 114 may manipulate the way in which information is provided to the user via an output component (e.g., display 112). Processor 102 may associate different metadata with the images captured by camera lens 114, including, for example, positioning information, device movement information, a time code, a device identifier, or any other suitable metadata. Electronic device 100 (e.g., processor 102, any circuitry of camera lens 114, or any other component available to device 100) may be configured to capture images with camera lens 114 at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2A:
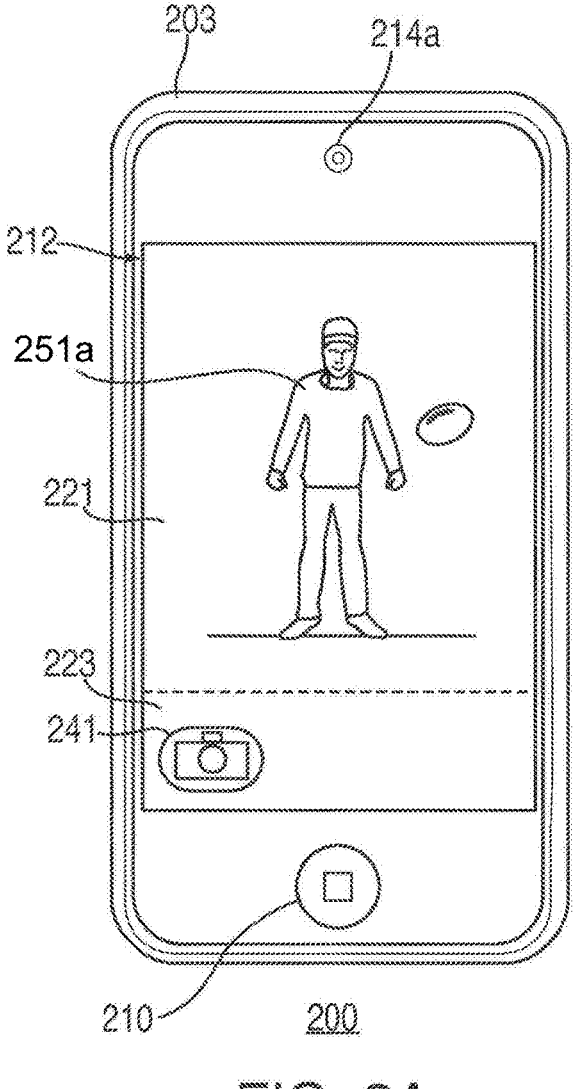
FIGS. 2A and 2B are elevated front and back views of an illustrative electronic device with an interface at a first stage in accordance with some embodiments of the invention.
Figure 2B:
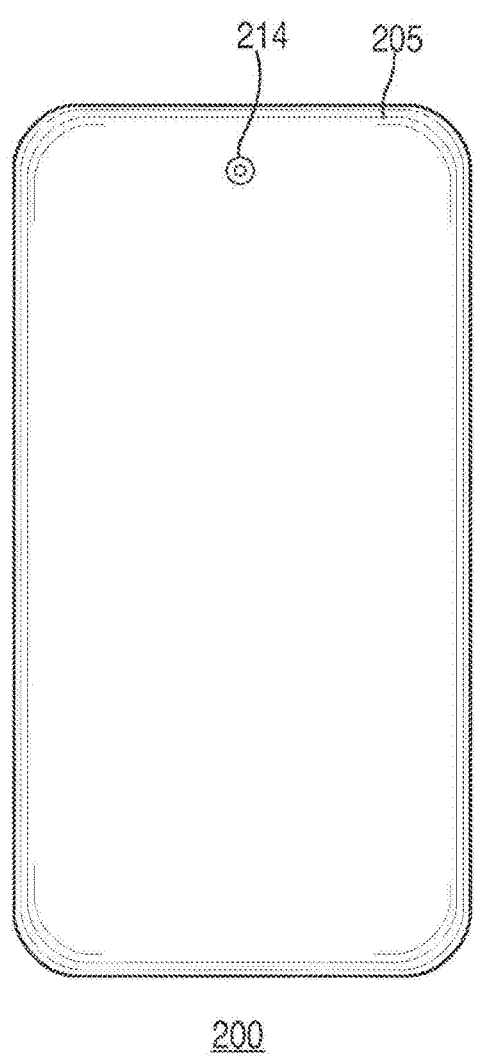

FIGS. 2A and 2B respectively show front and back views of an illustrative electronic device 200. Electronic device 200 may include some or all of the features of electronic device 100 of FIG. 1. In particular, electronic device 200 may include display 212 on a first side 203 of device 200 and camera lens 214 on second side 205 of device 200. In some embodiments, a camera lens may be provided on the same side as or an adjacent side to display 212 (e.g., camera lens 214a may be provided on first side 203 above display 212). When a camera mode of electronic device 200 is enabled, device 200 may provide a preview of the image most recently captured by lens 214 on display 212. For example, electronic device 200 may provide a preview of the image most recently captured by lens 214 (i.e., most recently captured image 251a) on a preview portion 221 of display 212.

In some embodiments, as mentioned above, display 212 may be a touch screen and may also act as an input component for device 200. Therefore, display 212 may provide a record input region on a portion of display 212. For example, when in a camera mode, electronic device 200 may provide record input region 241 on an auxiliary portion 223 of display 212. The user may press or otherwise select record input region 241 of display 212 to instruct device 200 to store the captured image currently being shown on preview portion 221 of display 212. For example, electronic device 200 may be configured to store most recently captured image 251a (e.g., in memory 104) in response to a user's selection of record input region 241 of display 212. In some embodiments, auxiliary portion 223 may be a portion of display 212 that is separate and distinct from preview portion 221 of display 212, such that no region of auxiliary portion 223 may overlap or otherwise interfere with the captured image being shown on preview portion 221. In yet other embodiments auxiliary portion 223 and preview portion 221 may each be provided on its own distinct display 212 of device 200.

In some embodiments, device 200 may be configured to store either an individual distinct image or many consecutive video frame images. For example, a first type of user selection of record input region 241 (e.g., a single tap of region 241) may instruct device 200 to store only the captured image currently being shown on preview portion

221 of display 212 as an individual distinct image. Alternatively, a second type of user selection of record input region 241 (e.g., a double tap of region 241) may instruct device 200 to store the captured image currently being shown on preview portion 221 of display 212 as well as additional images to be captured by camera lens 214 as consecutive video frame images for a certain duration, such as until record input region 241 is selected again. In some embodiments, record input region 241 may only be used to receive user inputs for storing individual distinct images and display 212 may provide a second record input region (not shown) that may only be used to receive user inputs for storing multiple images as consecutive video frame images. In other embodiments, electronic device 200 may include an additional input component 210, which may be distinct from display 212, and which may be used to receive user inputs for instructing device 200 to store one or more images captured by camera lens 214.

Figure 3:
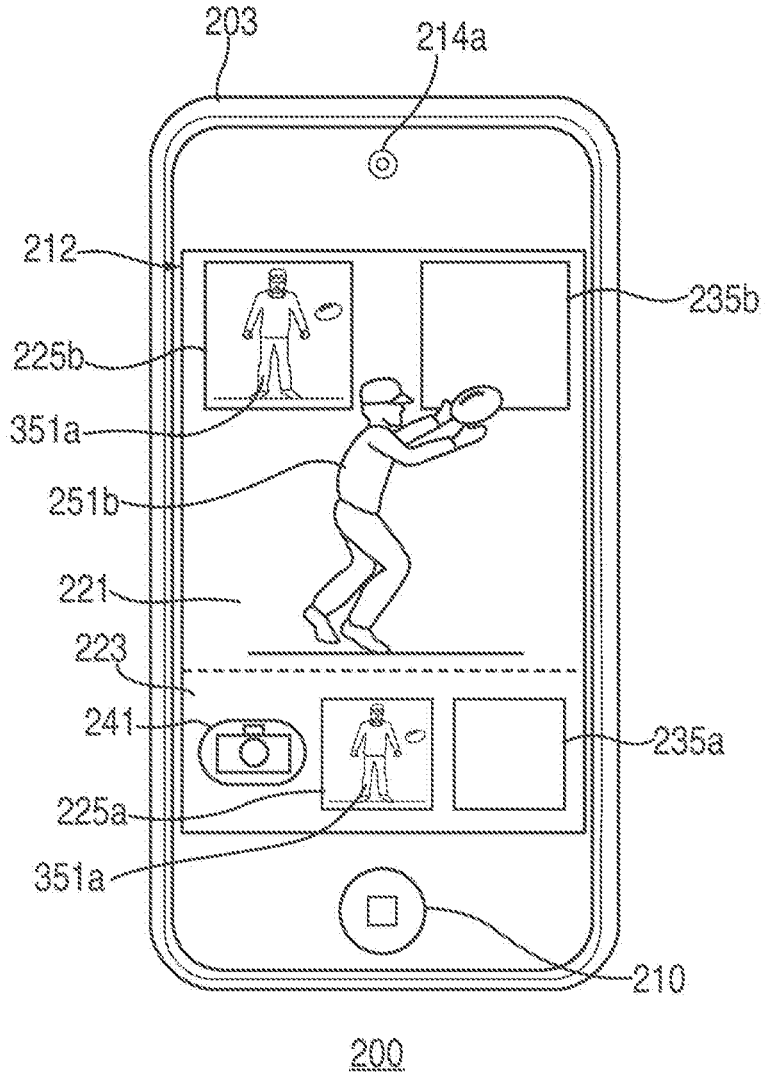
FIG. 3 is a front view, similar to FIG. 2A, of the electronic device of FIGS. 2A and 2B, with the interface at a second stage in accordance with some embodiments of the invention.

Once a certain individual distinct image or certain consecutive video frame images (i.e., image content) has been successfully selected and stored, an electronic device may display a review of the stored image content in order to show the user what has been successfully recorded. For example, after device 200 has successfully stored certain captured image content, device 200 may be configured to display a representation 351a of that stored image content on a review portion (e.g., review portion 225a and/or review portion 225b) of display 212, as shown in FIG. 3.

To enable the user to easily review stored image content while also being able to preview the current most recently captured image, electronic device 200 may be configured to display both images simultaneously on the display screen. This may allow the user to quickly see if he or she has stored the intended image content while also allowing the user to be immediately primed to store new image content. This may be useful, for example, when a user wants to rapidly take a series of photographs. For example, as shown in FIG. 3, device 200 may provide a preview of the image most recently captured by lens 214 (i.e., most recently captured image 251b) on preview portion 221 of display 212, while also simultaneously providing a review of stored image content (i.e., representation 351a) on review portion (e.g., review portion 225a and/or review portion 225b) of display 212.

In some embodiments, representation 351a may provide a review of stored image content that includes a certain individual distinct image (e.g., a stored photograph). For example, as shown in FIG. 3, representation 351a may provide a review of captured image 251a of FIG. 2A. Such a representation may be a replicated, compressed, condensed, or otherwise altered version of the individual distinct image that has been stored (e.g., a thumbnail of the photograph). Device 200 may be configured to simultaneously or otherwise store the captured image and generate a representative version of that image to be displayed as representation 351a.

Alternatively, in some embodiments, representation 351a may provide a review of stored image content that includes certain consecutive video frame images (e.g., a stored movie). Such a representation may be a replicated, compressed, condensed, or otherwise altered version of a single frame image of the consecutive video frame images that has been stored (e.g., a thumbnail of the first frame, middle frame, or last frame of the movie). Alternatively, such a representation may be a replicated, compressed, condensed, or otherwise altered version of two or more of the video frame images that have been stored. For example, the representation may be a video collage that replays some (i.e., two or more) or all of the stored video frame images in succession, either in a continuous loop or just once. The video collage may replay in succession at least two frames that may not be consecutive frames in the stored video image content. As another example, the representation may be a static collage that depicts some (i.e., two or more) or all of the stored video frame images as a single distinct image (e.g., a photomontage). Device 200 may be configured to simultaneously or otherwise store the captured consecutive video frame images and generate a representative version of those consecutive video frame images to be displayed as representation 351a.

In some embodiments, review portion 225a providing representation 351a may be separate and distinct from preview portion 221 of display 212, such that no region of review portion 225a may overlap or otherwise interfere with the captured image currently being shown on preview portion 221 (i.e., most recently captured image 251b). For example, device 200 may be configured to provide review portion 225a within auxiliary portion 223 of display 212 (see, e.g., review portion 225a of FIG. 3). This positioning of review portion 225a may provide a review of stored image content (i.e., representation 351a) that is adjacent to record input region 241.

Alternatively, device 200 may be configured to provide review portion 225b within preview portion 221 of display 212 (see, e.g., review portion 225b of FIG. 3). This positioning of review portion 225b may provide a review of stored image content (i.e., representation 351a) that is adjacent to or that is overlapping with the captured image currently being shown on preview portion 221 (i.e., most recently captured image 251b).

Electronic device 200 may be configured to continually generate and display a representation of stored image content for review by a user once that content has been stored. In some embodiments, a representation of newly stored image content may be displayed in place of a previously displayed representation of stored image content. For example, once device 200 stores new image content, a representation of that new image content may be displayed in review portion (e.g., review portion 225a and/or review portion 225b), and whatever had previously been displayed in review portion (e.g., (e.g., review portion 225a and/or review portion 225b with representation 351a) may be removed from display 212. Alternatively, a representation of newly stored image content may be displayed concurrently with a representation of previously stored image content. For example, once device 200 stores new image content, a representation of that new image content may be displayed in review portion (e.g., review portion 225a and/or review portion 225b), and the representation that had previously been displayed in review portion (e.g., (e.g., review portion 225a and/or review portion 225b with representation 351a) may instead be displayed in a second review portion (e.g., a review portion 235, such as one or both of review portions 235a and 235b of FIG. 3).

By configuring electronic device 200 to simultaneously display both a preview of the most recently captured image and a review of one or more representations of previously stored image content, a user may easily review the previously stored image content while device 200 remains in a camera mode that is able to immediately store new image content. This may provide the user with a visual confirmation of the image content he or she has previously stored while also providing the user with the ability see and store the most recently captured image at the same time. The visual representation of previously stored image content may permit the user to easily select and interact with (e.g., edit or delete) the previously stored image content. For example, if a user would like to interact with certain stored image content that is represented on display 212 (e.g., content represented in one of review portions 225*a* or 225*b* or review portions 235*a* or 235*b*), the user may easily select that specific content (e.g., by tapping on the particular review portion or otherwise appropriately manipulating an input component of device 200). When a specific review portion of display 212 is selected, device 200 may be configured to immediately access and present to the user the stored image content associated with that review portion (e.g., using the entire display screen).

Information can be displayed by electronic device 200 in various suitable ways. As the information changes, electronic device 200 can provide animations to assist the user in identifying newly displayed information, or to provide feedback that an instruction was properly received and executed. In some embodiments, a user interface can change as the content to be displayed changes. For example, if new image content is stored and is to be displayed as a representation for user review simultaneously with a preview of most recently captured image content, electronic device 200 may provide two distinct interfaces and an animation for the transition between the two interfaces (e.g., the interface before the representation is displayed (see, e.g., FIG. 2A) and the interface after the representation is displayed (see, e.g., FIG. 3)). The animation can be generated using any suitable approach, including, for example, using a graphics engine to render some or all of the intermediate frames between the initial and final interfaces (e.g., using processor 102 of FIG. 1).

To animate the change, electronic device 200 may identify distinct regions of the interface to be changed. For example, electronic device 200 can identify preview portion 221 and one or more of review portions 225*a*, 225*b*, 235*a*, and 235*b* of display 212 that may be changed in response to new image content being stored by a user. Electronic device 200 may pre-render the final interface (e.g., after a representation of the newly stored image content has been provided on display 212), and use cross-fading or other approaches to individually define a transition between the interface presented before the representation is shown and the interface presented with the representation.

Electronic device 200 can define the animation using any suitable approach. In some embodiments, electronic device 200 may first identify the distinct display regions for which interface transitions can be defined. Electronic device 200 may identify the regions using any suitable approach, including, for example, from metadata associated with particular regions, or from display properties of the interface elements. Electronic device 200 may define any suitable number of regions distributed at any suitable position on display 212. To animate the transition between the interfaces, electronic device 200 may apply rotations, cross-fading, scaling, or any other suitable transformations to generate a smooth animation between the interfaces. In some embodiments, the animation may be generated as a series of simultaneous and overlaid animations applied to each of the identified regions.

Figure 4:
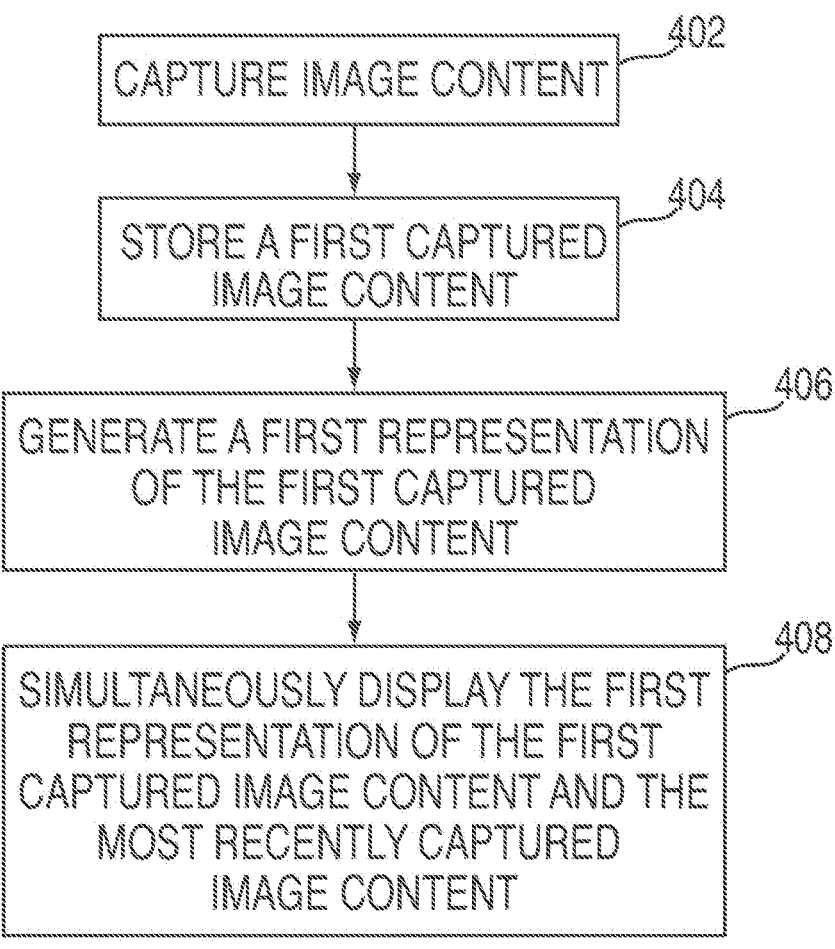
FIG. 4 is a flowchart of an illustrative process for displaying image content in accordance with some embodiments of the invention.

FIG. 4 is a flowchart of an illustrative process 400 for previewing newly captured image content and reviewing previously stored image content using an electronic device. At step 402, the electronic device can capture image content. For example, the electronic device can capture image content, such as an individual distinct image or at least two consecutive video frame images, using a camera lens. At step 404, the electronic device can store a first captured image content. For example, the electronic device may store in memory a first image content that has been captured by a camera lens in response to a user instruction. At step 406, the electronic device may generate a first representation of the first captured image content. For example, the electronic device may generate a compressed or redacted version of the first captured image content. Next, at step 408, the electronic device may simultaneously display the first representation of the first captured image content and the most recently captured image content. For example, once the electronic device has generated the first representation, the electronic device may display the first representation on a display screen of the electronic device to provide a user with the ability to review the previously stored image content. Moreover, the device may simultaneously display the image content most recently captured by the camera lens of the electronic device to provide the user with the ability to preview newly captured image content and review the previously stored content at the same as time. This process may be repeated, such that each time new image content is stored, a representation of that new image content may be generated and then displayed simultaneously with the most recently captured image content.

It is understood that the steps shown in process 400 of FIG. 4 are merely illustrative and that existing steps may be modified or omitted and that additional steps may be added.

It will be apparent to those of ordinary skill in the art that certain methods involved in the invention may be embodied in a computer program product that includes a machine readable and/or usable medium. For example, such a computer usable medium may consist of a read only memory device, such as a CD ROM disk or conventional ROM device, or a random access memory, such as a hard drive device or a computer diskette, or flash memory device having a computer readable program code stored thereon.

While there have been described systems and methods for previewing newly captured image content and reviewing previously stored image content using an electronic device, it is to be understood that many changes may be made therein without departing from the spirit and scope of the invention. It is also to be understood that various directional and orientational terms such as "front" and "back," "left" and "right," "top" and "bottom," and the like are used herein only for convenience, and that no fixed or absolute directional or orientational limitations are intended by the use of these words. For example, the devices of the invention can have any desired orientation. If reoriented, different directional or orientational terms may need to be used in their description, but that will not alter their fundamental nature as within the scope and spirit of the invention. Those skilled in the art will appreciate that the invention can be practiced by other than the described embodiments, which are presented for purposes of illustration rather than of limitation, and the invention is limited only by the claims which follow.

What is claimed is:

1. A method, comprising:

at an electronic device with a camera, a display, and one or more input devices:

displaying, via the display, a video capture user interface that includes a live preview of images captured by the camera;

while displaying the video capture user interface, detect, via the one or more input devices, a record input;

in response to detecting the record input, recording video via the camera; and once the video has been recorded, displaying, via the display, a visual representation of at least a portion of the recorded video.

2. The method of claim 1, wherein the visual representation of the portion of the recorded video is a representation of a still frame of video.

3. The method of claim 1, wherein the visual representation of the portion of the recorded video includes playing through two or more frames of the video.

4. The method of claim 3, wherein the playing through two or more frames of the video includes looping through at least some of the recorded video multiple times.

5. The method of claim 1, wherein the visual representation of the portion of the recorded video is displayed in the video capture user interface.

6. The method of claim 1, wherein the visual representation of the portion of the recorded video is displayed along with a record input region for instructing the electronic device to start recording video.

7. The method of claim 6, wherein the record input includes selection of the record input region.

8. The method of claim 6, wherein the record input includes selection of a hardware input component that is separate from the display.

9. The method of claim 1, wherein the visual representation of the portion of the recorded video is displayed along with a live preview of images captured by the camera.

10. An electronic device, comprising:

a display;

a camera;

one or more input devices;

one or more processors;

memory; and one or more programs, wherein the one or more programs are stored in the memory and configured to be executed by the one or more processors, the one or more programs including instructions for:

displaying, via the display, a video capture user interface that includes a live preview of images captured by the camera;

while displaying the video capture user interface, detect, via the one or more input devices, a record input;

in response to detecting the record input, recording video via the camera; and once the video has been recorded, displaying, via the display, a visual representation of at least a portion of the recorded video.

11. The electronic device of claim 10, wherein the visual representation of the portion of the recorded video is a representation of a still frame of video.

12. The electronic device of claim 10, wherein the visual representation of the portion of the recorded video includes playing through two or more frames of the video.

13. The electronic device of claim 12, wherein the playing through two or more frames of the video includes looping through at least some of the recorded video multiple times.

14. The electronic device of claim 10, wherein the visual representation of the portion of the recorded video is displayed in the video capture user interface.

15. The electronic device of claim 10, wherein the visual representation of the portion of the recorded video is displayed along with a record input region for instructing the electronic device to start recording video.

16. The electronic device of claim 15, wherein the record input includes selection of the record input region.

17. The electronic device of claim 15, wherein the record input includes selection of a hardware input component that is separate from the display.

18. The electronic device of claim 10, wherein the visual representation of the portion of the recorded video is displayed along with a live preview of images captured by the camera.

19. A non-transitory computer readable storage medium storing one or more programs, the one or more programs comprising instructions that when executed by an electronic device with a camera, a display, and one or more input devices cause the electronic device to:

display, via the display, a video capture user interface that includes a live preview of images captured by the camera;

while displaying the video capture user interface, detect, via the one or more input devices, a record input;

in response to detecting the record input, record video via the camera; and once the video has been recorded, display, via the display, a visual representation of at least a portion of the recorded video.

20. The non-transitory computer readable storage medium of claim 19, wherein the visual representation of the portion of the recorded video is a representation of a still frame of video.

21. The non-transitory computer readable storage medium of claim 19, wherein the visual representation of the portion of the recorded video includes playing through two or more frames of the video.

22. The non-transitory computer readable storage medium of claim 21, wherein the playing through two or more frames of the video includes looping through at least some of the recorded video multiple times.

23. The non-transitory computer readable storage medium of claim 20, wherein the visual representation of the portion of the recorded video is displayed in the video capture user interface.

24. The non-transitory computer readable storage medium of claim 19, wherein the visual representation of the portion of the recorded video is displayed along with a record input region for instructing the electronic device to start recording video.

25. The non-transitory computer readable storage medium of claim 24, wherein the record input includes selection of the record input region.

26. The non-transitory computer readable storage medium of claim 24, wherein the record input includes selection of a hardware input component that is separate from the display.

27. The non-transitory computer readable storage medium of claim 19, wherein the visual representation of the portion of the recorded video is displayed along with a live preview of images captured by the camera.

* * * * *